Figure 2:
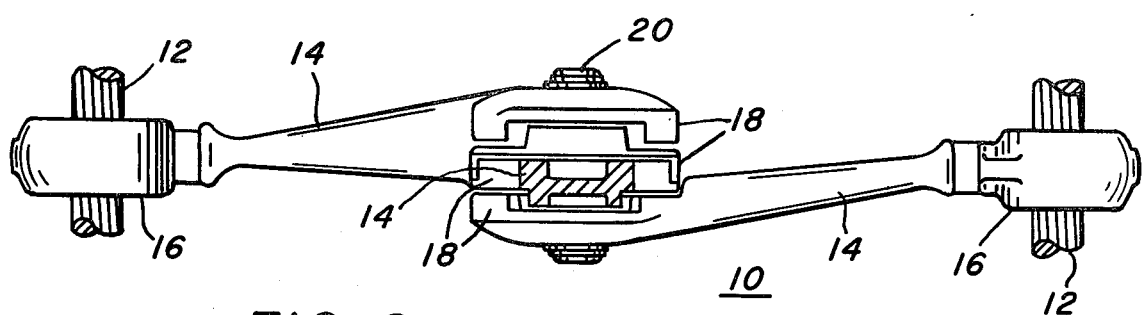

United States Patent [19]

Hawkins

[11] Patent Number: 4,471,156
[45] Date of Patent: Sep. 11, 1984

[54] DAMPING SPACER WITH VARIABLE DAMPING FEATURE

[75] Inventor: Ronald G. Hawkins, Massena, N.Y.

[73] Assignee: Aluminum Company of America, Pittsburgh, Pa.

[21] Appl. No.: 461,647

[22] Filed: Jan. 27, 1983

[51] Int. Cl.$^3$ .................... H02G 7/14; H02G 7/12
[52] U.S. Cl. .................................. 174/42; 174/146; 403/162; 403/170; 403/224
[58] Field of Search ............... 174/42, 146; 403/64, 403/162, 170, 217, 224, 228

[56] References Cited

U.S. PATENT DOCUMENTS

| | | | |
|---|---|---|---|
| 3,925,594 | 12/1975 | Rawlins | 174/42 |
| 3,940,553 | 2/1976 | Hawkins | 174/42 |
| 4,018,980 | 4/1977 | Mahajery et al. | 174/42 |
| 4,223,176 | 9/1980 | Hawkins | 174/42 |

FOREIGN PATENT DOCUMENTS 954710  4/1964  United Kingdom ............... 174/146

Primary Examiner—Laramie E. Askin
Attorney, Agent, or Firm—Elroy Strickland

[57] ABSTRACT

A damping spacer for overhead conductors comprises at least two rigid spacing arms, with each arm having means for clamping the same to a respective conductor. Each arm is provided with an integral hub structure for holding a composite elastomer damping element, the hub structures and damping element being mechanically held together by a pin means extending through the hub structures and damping element. The damping element is comprised of an inner structure made of a relatively soft elastomer material and an outer structure made of a relatively hard elastomer material. The soft elastomer is effective to dampen low amplitude, high frequency aeolian vibration, while the relatively hard elastomer is effective to dampen high energy, wake-induced oscillations in a conductor bundle. The hard material also serves as a stop mechanism to limit relative motion of the arms and hub structures. This provides protection for the soft elastomer and prevents clashing of the metal parts of the spacer.

4 Claims, 13 Drawing Figures

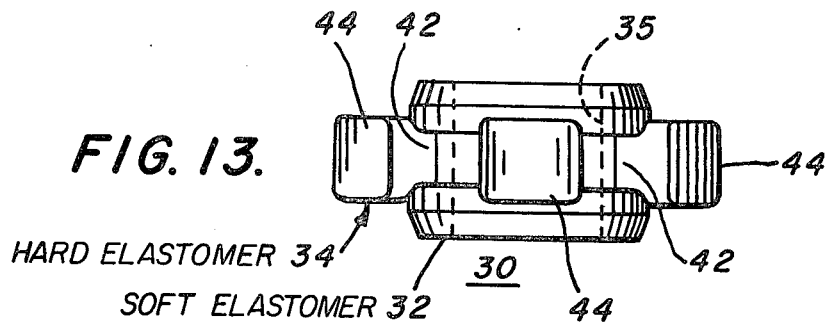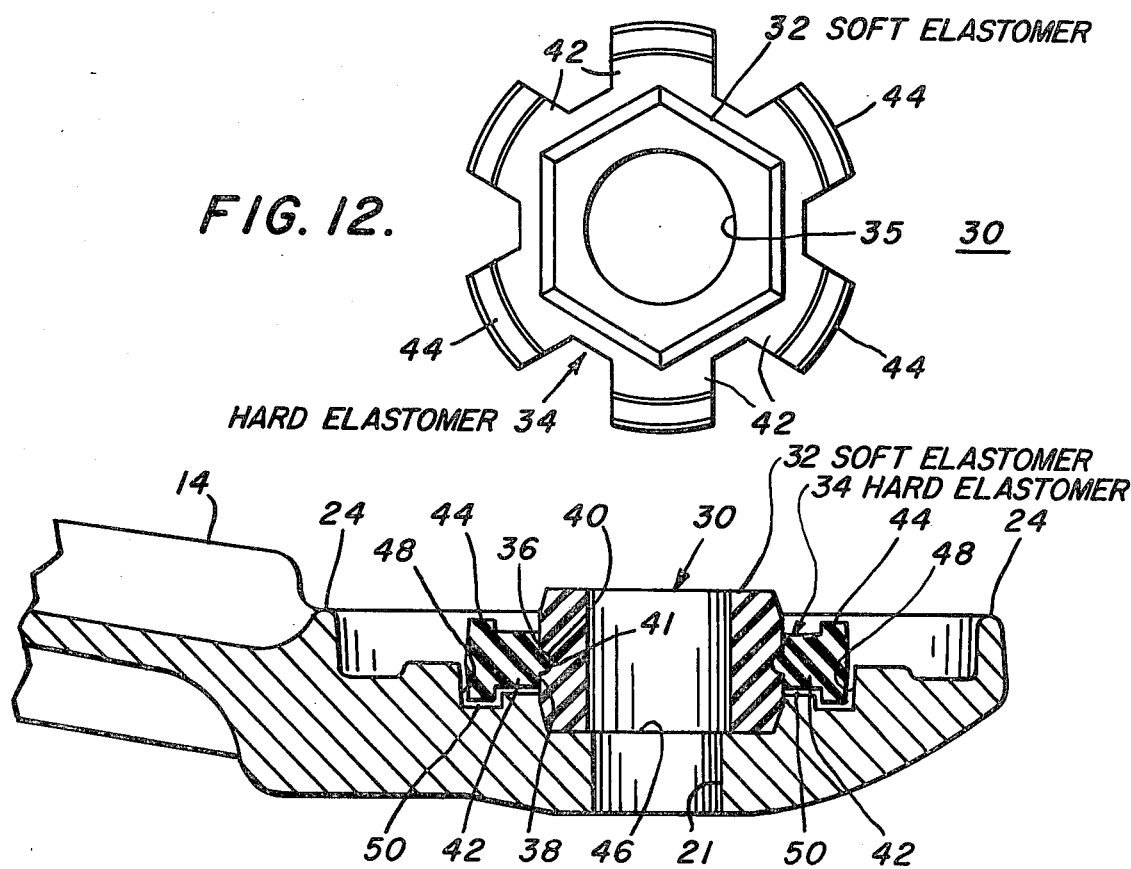

DAMPING SPACER WITH VARIABLE DAMPING FEATURE

BACKGROUND OF THE INVENTION

The present invention relates generally to damping spacers for overhead parallel conductors and particularly to a damping spacer having a variable damping characteristic that is effective to dampen aeolian vibrations in both low and high temperature environments as well as wake-induced oscillations that occur in conductor bundles.

A properly designed damping spacer for overhead conductor bundles should be capable of controlling two major forms of conductor motion, namely, an aeolian vibration and a wake-induced oscillation of one or more of the bundle conductors. An aeolian vibration is a conductor motion of relatively high frequency and low amplitude; it results from smoothly flowing winds moving at velocities of 2 to 15 miles per hour. Wake-induced oscillation, on the other hand, comprises motion of a relatively low frequency and large and sometimes clashing amplitudes. This type of motion is peculiar to bundle conductors and arises from the effects of the shielding of the leeward conductor by the windward conductor. The wake-induced phenomena is discussed in U.S. Pat. Nos. 3,925,594 and 4,018,980 to Rawlins and Moha-jery et al, respectively.

The design of an elastomer damping spacer for damping aeolian vibration is complicated by the effects of changes in temperature; i.e., when the temperature falls, the material of the damping elastomer tends to harden such that it is less amenable to working by the low energy of aeolian motion. For this reason the design of the spacer and the material of the damping element should provide a characteristic that is "soft" so that aeolian vibration is damped in the worst case, i.e., at the lowest anticipated cold weather condition. And for this reason such softness is ineffective as a damping mechanism when there is high energy input to the conductor under conditions of wake-induced oscillation.

In U.S. Pat. No. 4,223,176 to Hawkins, a damping spacer is shown in which damping elements are protected from the ultraviolet degradation of the sun by a hub interlock structure that is also effective to protect the damping elements from harm by wake-induced and other high energy oscillations. This latter function is acomplished by integral metal wall structures of the hub that act as stop means when conductor motion beomes excessive. However, under conditions where excessive motion of conductors is prolonged, the metal walls of the hub can become damaged due to prolonged, continuous impacting of the wall structures. Under such conditions, it would be better to have a stop mechanism that does not involve impacting of metal structures.

A damping spacer having motion limiting stop means introduces a shock into the system of the conductor bundle when the bundle experiences the phenomena of wake-induced oscillation. When a shock is applied to a distributed system, such as a conductor bundle, waves occur in the manner of the waves that radiate from the location where a stone thrown into a pond strikes the surface of the pond. The wavelengths and frequencies of these waves are not directly related to the frequency of the wake-induced oscillation, or the frequency at which stones are thrown into a pond. Generally, the frequencies of impact waves in a conductor bundle are higher than the frequency of the wake-induced oscillation. The source of the energy of the impact waves, i.e., the wind, is the same as that causing the conductor to oscillate. Hence, the energy imparted to impact waves is diverted from the energy of the oscillations induced by the wind. For this reason impacts provided by damping spacers appear as a form of damping. In addition, the impact waves that are generated, since they are of a higher frequency than wake-induced oscillations, will generally not correspond to a mode of conductor oscillation that is unstable, i.e., to a mode that tends to oscillate. Rather, the impact waves disperse through the bundle system and die out.

BRIEF SUMMARY OF THE INVENTION

In the present invention the shock experienced by the system of a conductor bundle will be that provided by a relatively hard material of a composite elastomer bushing in a damping spacer, as opposed to impacts between metal components of the spacer. In this manner wear and damage to the metal structure of the spacer are avoided while simultaneously providing a damping action (through impact dissipation, as described above) for the high energy, wake-induced oscillation. In addition, relative motion of the spacer components causes working of the relatively hard elastomer material such that at least some of the oscillation energy is damped and dissipated in the form of heat generated in the hard elastomer material.

In addition to the relatively hard material of the elastomer bushing, the invention utilizes an inner damping bushing made of a relatively soft elastomer material to care for the low energy, high frequency aeolian vibration. Further, the material of the inner bushing is such that it will dampen effectively in low temperature climates, there being several such materials commercially available.

The damping bushings of the invention are mounted in a hub structure having wall portions that protect the bushings from the detrimental effects of sunlight. These wall structures, however, do not act as stop means, as in the case of the above U.S. Pat. No. 223,176.

THE DRAWINGS

Figure 1:
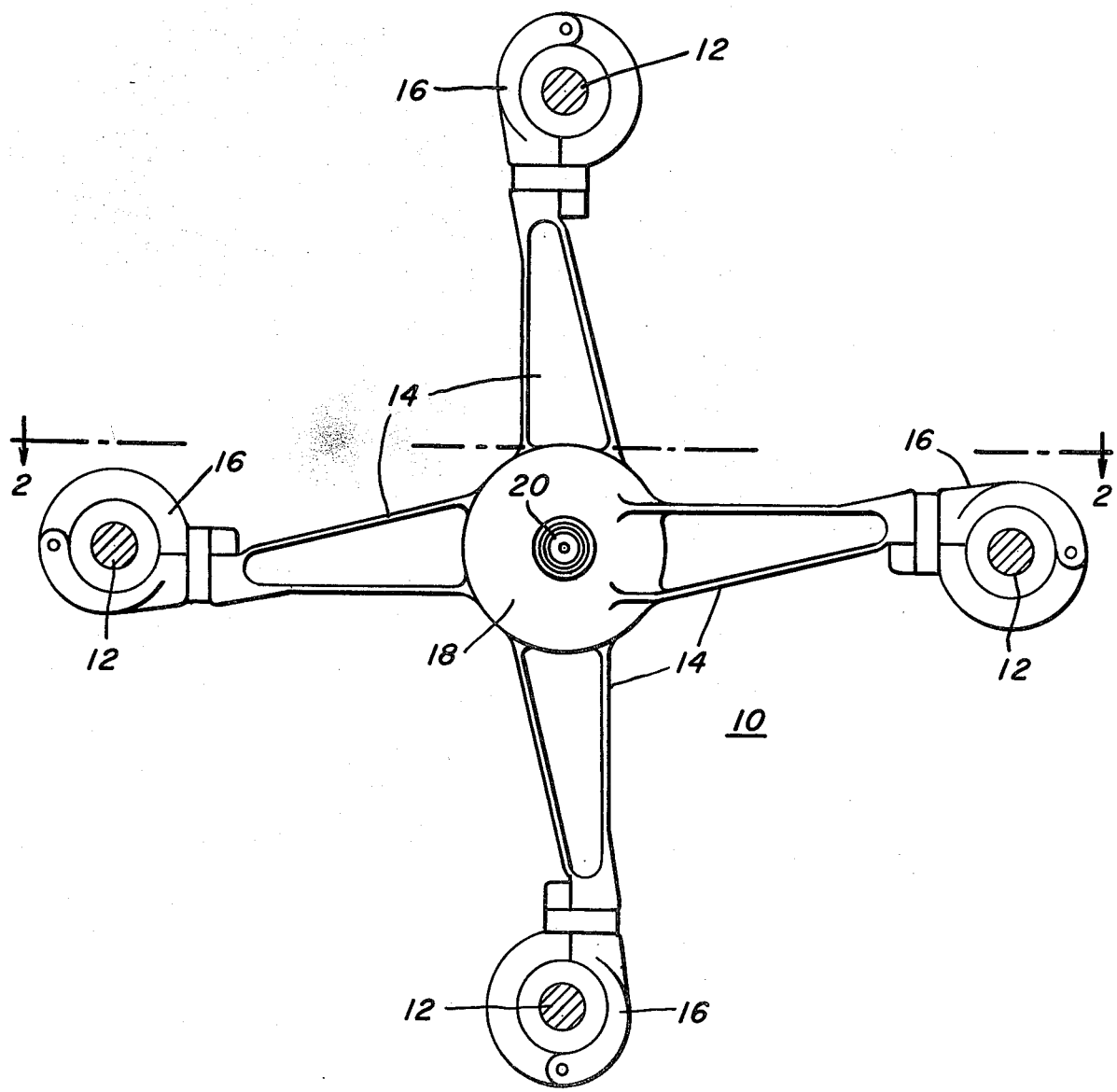
Figure 3:
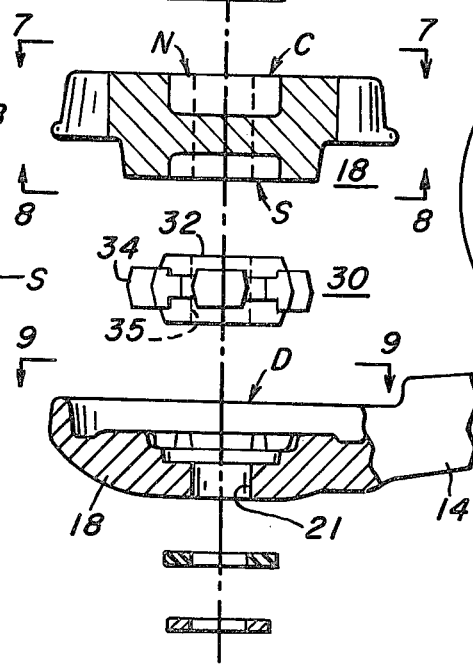
Figure 9:
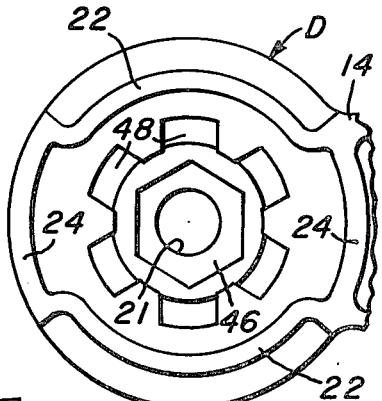
Figure 10:
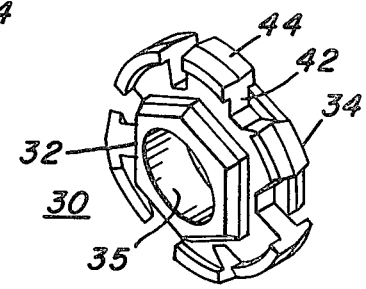

The invention, along with its advantages and objectives, will best be understood from consideration of the following detailed description along with the accompanying drawings, in which:

FIG. 1 is a front elevation view of a frameless four-conductor damping spacer of the invention, FIG. 2 is a view taken along lines 2—2 of FIG. 1, FIG. 3 is an exploded view of a center portion of the damping spacer of FIGS. 1 and 2, with portions thereof shown in section, FIGS. 4 through 9 are plan views of the inside faces of hub structures taken along corresponding line numbers in FIG. 3, FIG. 10 is an isometric view of a composite damping bushing depicted in FIGS. 3, 11, 12, and 13, FIG. 11 is a sectional view of one hub structure of the invention showing the damping bushing seated in the hub structure, FIG. 12 is a plan view of the bushing, and FIG. 13 is a side elevation view of the bushing.

PREFERRED EMBODIMENT

Referring now to FIGS. 1 and 2 of the drawings, numeral 10 designates generally a frameless damping spacer for installation in a bundle of four conductors 12, though the invention is not limited to spacing four conductors or to frameless spacers. The principles of the invention are applicabe to frame-type damping spacers, for example, as shown in U.S. Pat. No. 4,223,176 to Hawkins.

Preferably, the material of 10 is a lightweight metal such as aluminum.

The damping spacer 10 includes arm structures 14, with each arm having means 16 at the distal end thereof for clamping spacer 10 to conductors 12. At the other end of each arm is an integral hub structure 18, and pin means 20 (extending through an opening 21 in the hub structures) securing the arms together at the location of the hubs.

In the four-conductor damping spacer of FIGS. 1 and 2, there are four hubs 18 integral with the respective arms 14, as more clearly seen in the exploded view of FIG. 3. In FIG. 3, the upper and lower hubs 18 are the outside hubs of the assembly of spacer 10. Only the inside faces of these hubs are provided with peripheral wall structures and recesses, as discussed below. The two intermediate inner hubs 18 in FIG. 3, however, have such peripheral wall portions and recesses on both faces thereof. These four hubs mate together in the manner generally shown in FIG. 2. The mating is such that the wall structures of the hubs are located to shield the interior (and damping bushings described hereinafter) of the hubs from sunlight but are located to act as stop means only when the conductor is subjected to high mechanical loading, such as occurs with an electrical short circuit or tornado velocity winds. In addition, the hubs protect an inner damping bushing (32) should an outer bushing (34) fail, while simultaneously spacing the conductors of the bundle. The stops provided by hubs 18, however, are not used in the everyday life of the spacer.

In order to make the detailed description of the four hubs of FIG. 3 clear, the hubs are respectively labeled A through D beginning with the uppermost hub in FIG. 3. The opposed faces of inner hubs B and C are labeled N and S (North and South) for the same reason. The orientation of the hubs in FIG. 3 is that of a spacer 10 ready to be assembled.

Figure 4:
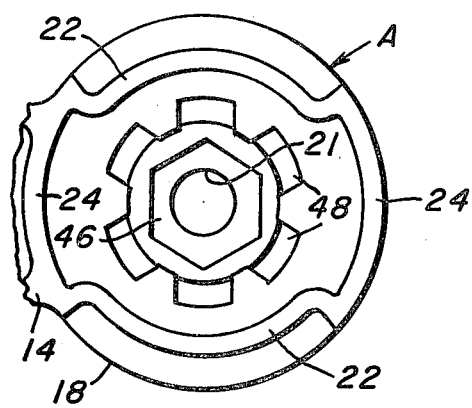

In referring to the uppermost hub in FIG. 3, i.e., hub A, as it is depicted in FIG. 4, it will be noted that the inner face of hub A is provided with opposed, integral, raised wall portions 22 located inwardly of the edge of the hub. However, at locations 90° from the center of the arc of wall portion 22 are located integral, raised wall portions 24; portions 24 are located at the edge of the hub. This is also true for the inner face of the lowermost hub D in FIG. 3, FIG. 9 being a plan view of this face of hub D.

Figure 5:
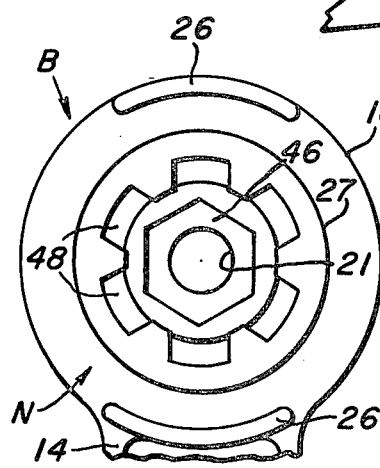
Figure 8:
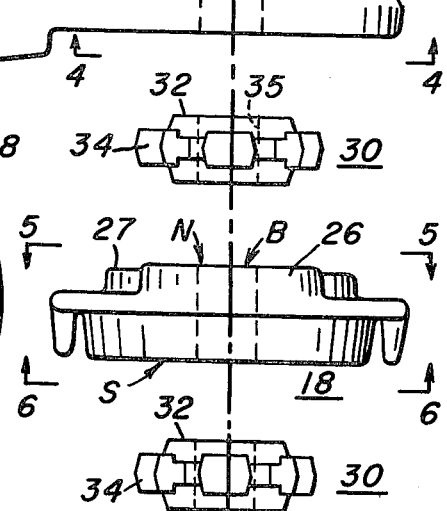
Figure 8:
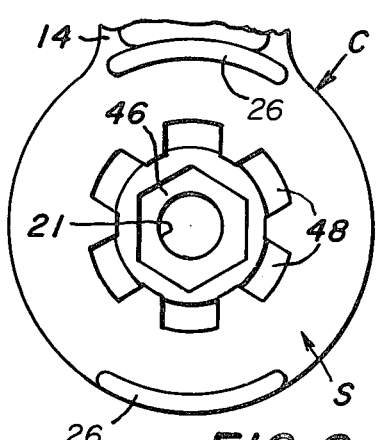

Referring now to the upper (N) face of the next lower hub, hub B in FIG. 3, particularly as it is depicted in FIG. 5 of the drawings, it will be noted that this hub has opposed, peripheral, raised walls 26 and that these walls have the same orientation as the raised wall portions 22 in FIG. 4. However, walls 26 are located at the edge of the hub instead of being at a location inwardly of the edge. When the spacer is assembled, the walls 26 of hub B are located outside the walls 22 of hub A; wall portions 24 of hub A are, in turn, located between the ends of walls 26 of hub B. A circular raised portion or wall 27 found on the upper (N) face B in FIG. 3 that surrounds depressions 46 and 48, as discussed below, is provided in the faces of the hubs.

Figure 7:
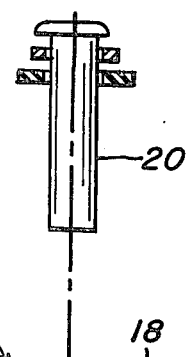
Figure 7:
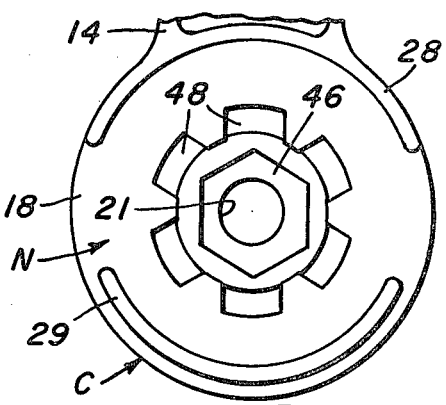
Figure 6:
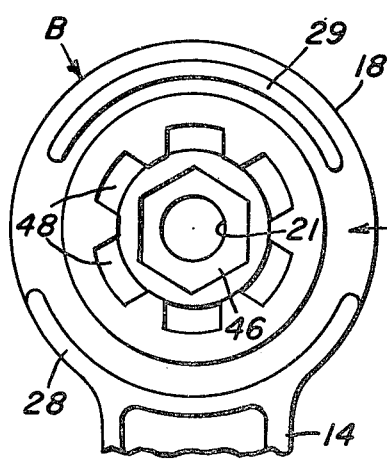

Referring now to FIGS. 6 and 7, the downward face S of hub B (in FIG. 3) seats in the upward face of hub C when assembling the spacer 10 of the present invention. As shown in FIG. 6, the south (S) face of hub B has a peripheral, raised curved wall 28 adjacent arm 14 and an opposed, raised curved wall 29, 28 being located at the edge of the hub while 29 is located inwardly of the edge.

A similar arrangement is provided on the N face of hub C, as shown in FIG. 7, except that the locations of 28 and 29 in FIG. 7 are opposite to the locations of 28 and 29 in FIG. 6, when the arms 14 of each are properly oriented. In this manner, 28 on B locates outside 29 of C, and 28 of C locates ouside 29 of B.

Hubs C and D go together in the manner of hubs A and B above, as the orientation of the walls of D are the same as A, and walls of the S face of C are the same as the walls of the N face of B.

Between each two adjacent hubs of the spacer 10 is located a composite elastomer bushing 30. An isometric view of this bushing is shown in FIG. 10. The bushing is comprised of a relatively soft inner portion 32, such as a soft synthetic rubber material, and a relatively hard outer portion 34, for example, a hard synthetic rubber material. The inner portion 32 of bushing 30 is provided with a center opening 35.

More particularly, the soft inner portion 32 of the composite bushing 30 is shown as a hexagon shape (in viewing the opposite sides or faces of 32 in elevation) bushing having an outer peripheral surface, as indicated at 36 in FIG. 11. Seated against surface 36 is an inner peripheral surface 38 of the hard outer bushing 34, again, as shown in FIG. 11. All of this requires a center opening 40 (FIG. 11) provided in outer bushing 34 to accommodate inner bushing 32. The opening is shown in the form of a tongue, and the outer surface 36 provided with a groove 41 such that a mating tongue and groove structure is provided between the inner and outer bushings. The diameters of opening 40 and groove 41, and the diameters of 38 and 36, are such that the two bushings fit snugly together.

As depicted in FIGS. 10 through 13 the shape of the outer portion 34 of bushing 30 involves relatively short integral outwardly extending legs 42 having, in turn, short integral and lateral extensions 44. The breadth and thickness of each leg and extension are such that a strong, broad beam is provided to arrest conductor oscillation in the manner described below.

To accommodate composite bushing 30, as thus far described, the hub structures 18 are provided with recesses 46 and 48 having configurations corresponding to the respective shapes of bushing portions 32 and 34.

Specifically, the inner faces of hubs A and D and both faces of hubs B and C are provided with a hexagonal recess 46, as shown in the plan views of FIGS. 4 through 9. Hexagonal recesses 46 are sized in breadth and depth to receive the inner hexagonal bushings 32; the structures of the hubs around recesses 46 hold the bushings 32 against rotation when relative rotation of two or more of the arms 14 of the spacer 10 move about pivot pin 20.

Similarly, the same faces of hubs 18 are provided with recesses 48 which have a configuration corresponding to that of the outer bushing 34 of 30, including its legs 42 and extensions 44. The size of recesses 48 in breadth and depth is such that 34 can be received in the recesses, the structure of the hub about each recess, again, being effective to hold the legs and extensions of 34 against rotation when relatively large rotational movements of the hubs 18 and arms 14 occur about pin 20.

However, as shown in FIG. 11, clearances 50 are provided between outer bushing 34 and the structure of hubs 18 for reasons explained hereinafter.

The holding of the soft inner bushing 32 against rotation, such as occurs when one or more of the conductors 12 vibrate under conditions of aeolian vibration, causes working the bushing such that heat is generated in the bushing. The bushing gives up this heat to the atmosphere and wind thereby dissipating the energy of the wind received by the conductor and causing it to vibrate. This results in immediate damping, i.e., immediate arrest of conductor vibration.

The beam structures of legs 42 and extensions 44 of outer bushing 34, which are made of a relatively hard elastomer material, function to stop relative movement between the arms of spacer 10 when one or more of conductors 12 oscilate under conditions of wake-induced oscillations. This stopping function prevents the ends of adjacent walls of the hubs 18, i.e., walls 24 and 26, and 28 and 29, from impacting against each other when the conductors oscillate, thereby preventing wear of and damage to the walls of the hubs.

In addition, the hard outside bushing 34 provides fatigue protection for the soft inside bushing 32, i.e., 34 protects 32 against motions that would result in excessive torsional shear.

The stopping function provided by the outer bushing 34 provides impact damping in the manner described earilier. By abruptly stopping oscillating movement of one or more of the conductors, a shock wave is introduced in the system of the bundle of conductors. The energy of the shock wave is now diverted or subtracted from the energy of the oscillation since the source of the shock and the oscillation, i.e., the wind, is the same.

In addition, outer bushing 34 is worked by the high amplitude oscillation such that heat is generated in 34 and the energy of the oscillation dissipated. However, because of the clearance 50 provided between outer bushing 34 and the structure of hubs 18, as exemplified in FIG. 11, the outer bushing does not offer damping or friction under conditions of low amplitude aeolian vibration of a conductor 12. Under such conditions, the inner bushing is free to do its damping task, i.e., the outer bushing does not restrain relative, low amplitude movement of arms 14. However, with large amplitude movement of the arms and conductors, the outer bushing immediately functions to dampen and stop such movement in the manner explained above.

In the above manner, both aeolian vibration and wake-induced oscillation are damped in a conductor bundle using a relatively simple bushing and hub structures. In addition, the hub structure is such that the damping spacer of the invention can be converted to space bundles having two or three conductors, or more than four in the manner described in U.S. Pat. No. 4,223,176 discussed earlier.

While the inention has been described in terms of preferred embodiments, the claims appended hereto are intended to encompass all embodiments which fall within the spirit of the invention.

What is claimed is:

1. A damping spacer for overhead conductors comprising:
    at least two rigid spacing arms, each having means for clamping the arms to respective conductors,
    a hub structure integral with each spacing arm,
    a rigid pin means extending perpendicularly through the hub structures to mechanically connect the arms together at the location of the hub structures,
    a recess provided in at least one face of each hub structure for receiving an elastomer bushing, and for holding the same against rotation when the hub structures rotate relative one to the other, and
    an elastomer bushing located in said recesses and between the hubs, said bushing being comprised of a first inner structure made of a relatively soft elastomer material, and an outer structure made of a relatively hard elastomer material.

2. The damping spacer of claim 1 in which the outer elastomer structure is provided with outwardly extending projections, and the recess in each hub structure for receiving and holding the elastomer bushing includes corresponding recesses for receiving and holding the projections.

3. The damping spacer of claim 2 in whicch the projections of the outer elastomer structure are provided with relatively short, lateral extensions.

4. The damping spacer of claim 1 in which the inner elastomer structure has an outer peripheral surface and a groove provided in said surface, the outer elastomer structure being seated in said groove.

* * * * *